United States Patent [19]
Menzel

[11] Patent Number: 5,660,912
[45] Date of Patent: Aug. 26, 1997

[54] PLASTIC PROFILED STRIP FORMING HELICALLY WOUND TUBE USING HINGED FLAP FOR JOINTING

[75] Inventor: Stanley William Otto Menzel, Dry Creek, Australia

[73] Assignee: Rib Loc Australia Pty Ltd, South Australia, Australia

[21] Appl. No.: 581,506

[22] PCT Filed: Jul. 14, 1994

[86] PCT No.: PCT/AU94/00395

§ 371 Date: Jan. 11, 1996

§ 102(e) Date: Jan. 11, 1996

[87] PCT Pub. No.: WO95/02779

PCT Pub. Date: Jan. 26, 1995

[30] Foreign Application Priority Data

Jul. 14, 1993 [AU] Australia ................. PL9931

[51] Int. Cl.[6] ............................................ F16L 1/00
[52] U.S. Cl. ................. 428/99; 428/192; 428/60; 428/61; 138/122; 138/129; 138/154; 405/146; 405/152; 156/191
[58] Field of Search ........................ 428/57, 60, 61, 428/99, 192; 29/450; 138/122, 129, 154; 405/152, 146; 156/191

[56] References Cited

U.S. PATENT DOCUMENTS

| 4,566,496 | 1/1986 | Menzel et al. | 138/154 |
| 5,101,863 | 4/1992 | Fuji et al. | 138/154 |

FOREIGN PATENT DOCUMENTS

| 70216/91 | 10/1991 | Australia . |
| WO82/01757 | 5/1982 | WIPO . |
| WO88/00129 | 1/1988 | WIPO . |

*Primary Examiner*—Alexander Thomas
*Attorney, Agent, or Firm*—Klauber & Jackson

[57] ABSTRACT

A plastic profiled strip (10) is provided for producing helically wound tubes or pipes, the strip (10) having female and male joint formations (13, 14) extending along opposite longitudinal margins thereof and arranged so that upon spirally winding the strip into a tubular form, the joint formations (13, 14) can be interlocked to thereby lock adjacent windings of the strip together, the male joint formation (14) comprising a hinged flap (15) which is flexibly connected to the strip (10) for hinging movement between a disengaged or unlocked position displaced from the plane of the strip (10) and a locking position wherein it interlocks with the female joint formation (13) of an adjacent winding of the strip (10).

18 Claims, 3 Drawing Sheets

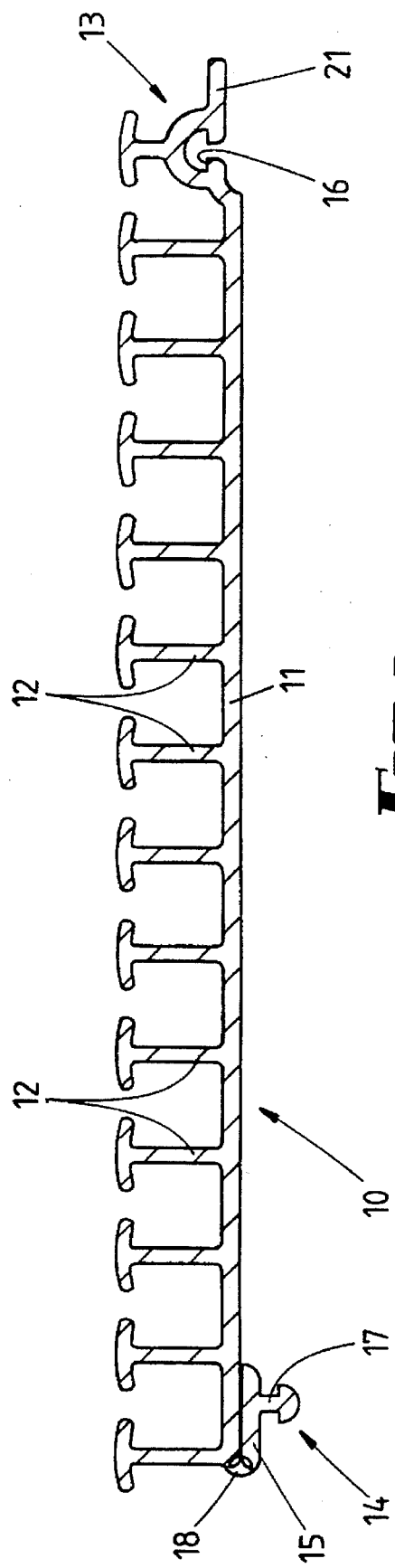
*FIG 1*
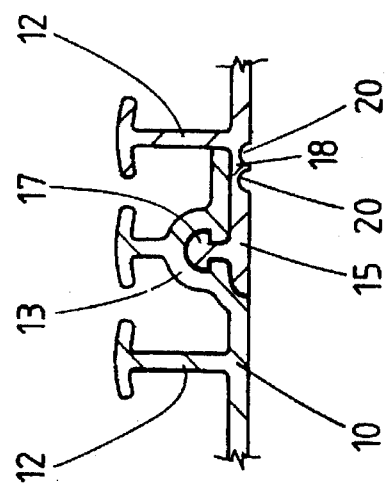
*FIG 2*
*FIG 3*

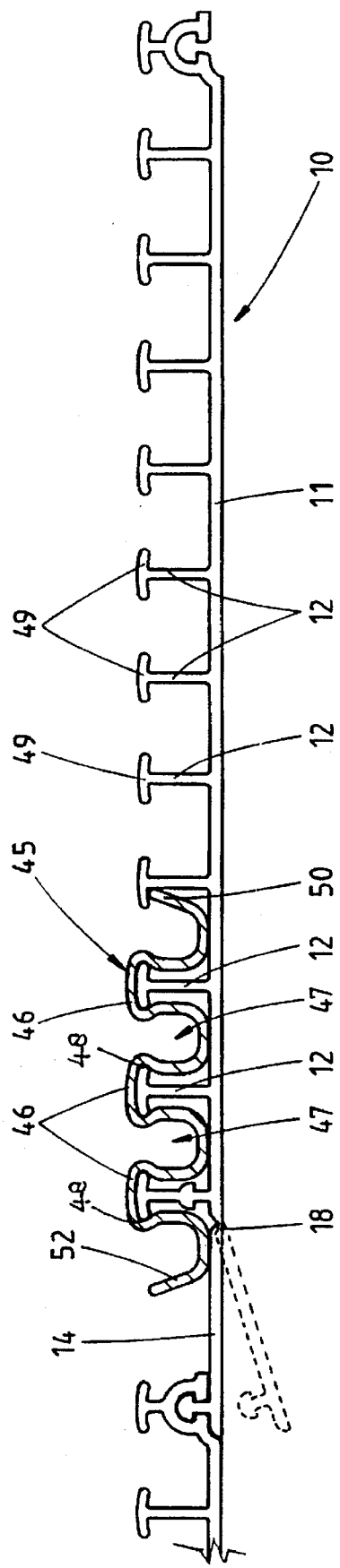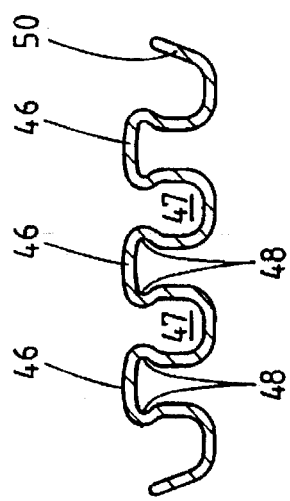
FIG 6
FIG 7

5,660,912

PLASTIC PROFILED STRIP FORMING HELICALLY WOUND TUBE USING HINGED FLAP FOR JOINTING

FIELD OF THE INVENTION

This invention relates to improvements in and to a plastic strip used for producing a helically wound tube or pipe for renovating and/or protecting sewers and pipes. In particular, the invention is concerned with an improved means and method for sealingly joining together the adjacent turns or convolutions of a spirally wound tube or pipe.

BACKGROUND OF THE INVENTION

It is well known that concrete pipes and the like after some years of services can fail due to the corrosive nature of the liquid that flows through them. To fix a protective lining to the bore of such pipes is well proven and one known method is to take a spiral winding machine and spirally wind a plastic profile directly into the bore of the pipe to be relined. In many instances however, where the pipe to be relined is of such a large diameter and of oval configuration, spirally machine wound tubular liners are not convenient and are unsatisfactory in terms of practical efficiency.

The applicant is also aware of a method of renovating and/or protecting sewers and pipes disclosed in Australian Patent Application No 70216/91 dated 4th Feb. 1991 (Danby) wherein an elongate plastic strip is first spirally wound into the sewer or pipe to be relined, following which the adjacent convolutions or windings of the strip are manually aligned so that their marginal joint formations are in abutting relationship, and thereafter a separate elongate joining strip is used to join together the abutting joint formations of the adjacent convolutions of the strip to in turn lock the convolutions of the strip together.

It will be immediately evident that such a method entails the feeding in and handling by the workman located in the pipe, of two separate strips, namely the tube or pipe forming liner strip and the joining strip.

SUMMARY OF THE INVENTION

It is the main object of the present invention to provide an improved plastic profiled strip which will obviate the need for a workman to handle two separate strips when renovating or relining an internal passageway such as a sewer pipe, manhole or tank, and which will simplify the jointing together of the adjacent convolutions of the helically wound strip after having been located in the bore of the passageway being relined.

It is another object of the present invention to provide an improved plastic profiled strip which is particularly suited for relining of sewers and pipes which contain variations in diameter along their lengths.

Other preferred objects will become apparent from the following description.

Accordingly, the present invention is directed to an improved plastic profiled strip for use in forming helically wound tubes or pipes, comprising a series of outwardly extending rib formations spaced apart across the width of the strip on the outer side thereof to thereby form a series of open longitudinally extending side-by-side channels, a male joint formation adjacent one longitudinal edge of said strip and extending therealong and a female joint formation adjacent the other opposite longitudinal edge of the strip and extending therealong, the adjacent male and female joint formations of adjacent windings of the strip being adapted to interlock to thereby lock the adjacent windings of the strip together, characterised in that one of said joint formations is flexibly connected to the strip so as to permit that joint formation to hinge or flex about an axis which extends longitudinally of the strip and which is spaced a short distance inwardly of said one joint formation, arranged and constructed so that said one joint formation is hingedly movable between a disengaged or unlocked position wherein it is displaced from the plane of the strip and a locking or engaged position wherein it interlocks with the other of said joint formations.

Preferably, said one of the interlocking joint formations is the male joint formation and comprises a hinged flap integrally formed with the strip and joined thereto by a hinge section which can be a co-extruded section of soft plastics material which can have the same or less thickness than the thickness of the main strip, or a connecting web of reduced wall thickness which forms a longitudinal hinge line.

Preferably the male joint formation comprises an outwardly directed approximately T-shaped locking rib, whilst the female joint formation comprises a complementary shaped groove or recess formed adjacent to and extending along an edge portion of the strip which is offset from the main body of the strip by the thickness of the strip.

In another preferred embodiment of the invention, the male joint formation forms part of a separate attachment strip which is fixedly joined to a longitudinal edge portion of the strip prior to the strip being helically wound. Of course, in practice, it will be far more advantageous for the strip to have the male joint formation integrally moulded therewith.

Preferably the female joint formation terminates in a horizontally extending lip or flange which is arranged, when the strip is helically wound into position within the passageway being relined, to abut the vertical wall of a respective said rib formation located adjacent the hinged flap of an adjacent winding or convolution.

In a preferred embodiment of the invention, there is provided a separate stiffening strip which interlocks with and overlies a portion of the main profiled strip in order to stiffen same and prevent the strip from being overstressed, which may otherwise occur during the grouting process when grout is fed into the space between the outer side of the strip and the inner surface of the pipe being relined, and which may cause inward bulging of the tubular liner.

Preferably, the stiffening strip has a corrugated profile and is lockingly fitted to the main strip adjacent the hinge axis (or hinge region) of the hinged flap so that it provides adequate reinforcing or stiffening of the strip in the region of the hinge flap. This will ensure that the main strip, when helically wound within a pipe being relined, is retained in contiguous relationship with the inner surface of the pipe, particularly when the strip is made of a "soft" plastics material. In addition the stiffening strip reduces the likelihood of the hinged locking flap disengaging from its mating locking member during the grouting process when the strip is stressed.

Preferably, the stiffening strip has a portion thereof which overlaps a portion of the hinged flap.

Preferably, the stiffening strip terminates along its outer margin in an outwardly opening U-shaped channel formation which, when the strips are interlocked, has its bottom wall contiguous with the hinged flap in the region of its hinge axis.

Preferably, the stiffening strip comprises a plurality of alternating valleys and ridges having a depth which approximates to the depth of the rib formations on the main strip.

Preferably, each of the ridges has an upper profile portion shaped and dimensioned so as to interlock with a respective T-shaped rib formation on the main strip, when the stiffening strip is press-fitted thereonto.

The stiffening strip can thus be used to provide localised reinforcing in the area of the hinged flap whilst at the same time ensuring that the strip as a whole is sufficiently stiff so that it will remain contiguous (or nearly so) with the inner pipe surface.

With the plastic profiled strip of the present invention, one avoids the need for a workman stationed within the pipe to be relined, to have to handle and contend with two separate plastic strips (as is the case with the arrangement described and claimed in Australian Patent Application No 70216/91). With the present invention, the plastic profiled strip has a locking member provided on a flexible hinged flap extending along one edge of the plastic strip so that when the strip is placed into position and intimate with the wall of the pipe or manhole being relined, the hinged locking member can be positioned away from its mating locking member until the helical windings of the strip are essentially in place, following which the hinged locking member is hinged or rotated so that the male and female locking members are interlocked to permanently seal and lock the windings together.

Preferably, an elastomeric sealing element is prepositioned into one of the locking formations so that when the joint formations are thus interlocked, a water tight seal is formed. Alternatively, an electrical wire can be embedded into one of the locking formations so that when same are interlocked and electrical current is applied to the wire, the formations are fused together by heat.

Preferably, the plastic profiled strip is extruded from polyethylene, polypropylene or PVC material and has a substantially planar body with a plurality of T-shaped ribbed formations which extend outwardly from the outer surface of the body. This configuration is well known in the art.

The main body of the plastic profiled strip can also be provided with a plurality of longitudinally extending hinge lines, eg by forming reduced wall thickness sections, to facilitate lining of tapered pipes or pipes that have serious offsets or bends. Such hinge lines may be located between adjacent rib formations on the strip.

The improved jointing arrangement of the present invention can also be applied to effect the jointing together of two finished spirally wound pipes. This would entail the use of a separate joining strip comprising male and female joint formations extending along opposite edge portions of the strip, one of which is hingedly connected to the strip. The joining together in end-to-end relationship of the two spirally wound pipes is effected by attaching one of the joint formations on the joining strip to the last or final winding or convolution of one of the finished spirally wound pipes and thereafter bringing the other spirally wound pipe in end-to-end contiguous relationship, whereupon the hinged joint formation of the joining strip is "flipped over" and engaged, eg by hammering, with a locking formation adjacent the end of the second finished pipe, the two pipes thereafter being fixedly joined together. This can be equally applied from either the inside or outside of the pipe.

BRIEF DESCRIPTION OF THE DRAWINGS

In order to more fully describe and further explain the present invention, several embodiments will now be described hereunder in which:

FIG. 1 is a sectional end view of the liner strip according to a first embodiment of the invention, showing the male locking member in its folded-back disengaged position;

FIG. 2 is a fragmentary sectional end view of adjacent windings of the liner strip shown in FIG. 1, helically wound in position within a pipe or passageway (not shown) being relined;

FIG. 3 is a view similar to FIG. 2, showing the hinged male locking member urged into locking engagement with the female locking member of an adjacent winding of the strip;

FIG. 6 is a sectional view, similar to FIG. 1, showing a stiffening or enhancer strip fitted to the liner strip in the region of the hinged flap; whilst FIG. 7 is a cross-sectional view of the stiffening strip shown in FIG. 6.

DETAILED DESCRIPTION OF THE PREFERRED EMBODIMENTS

Figure 4:
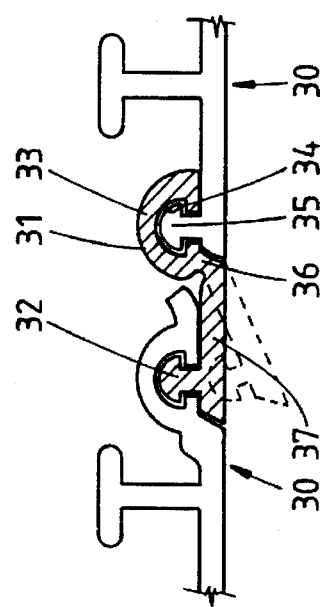
FIG. 4 is a sectional end view similar to that shown in FIG. 3 wherein the hinged male locking member forms an integral part of a separate joining strip fitted to the liner strip prior to it being fed into the passageway being lined, according to a second embodiment of the invention.

Referring firstly to the embodiment illustrated in FIGS. 1–3 of the accompanying drawings, there is shown a plastic profiled strip 10, preferably extruded of rigid PVC, having a planar main body 11 with a smooth inner surface and a plurality of T-shaped rib formations 12 formed integrally with the strip 10 extending outwardly from the outer surface of the body 11. As is well known in the art, the rib formations 12 strengthen the strip when helically wound, space the body 11 from the inner surface of the pipe or passageway being relined, and key the liner strip 10 to grout which may be injected into the cavity between the strip 10 and the inner surface of the pipe or passageway.

The strip 10 is provided with joint formations 13, 14 extending longitudinally along opposite edge portions respectively of the strip 10, the joint formation 13 constituting a female joining member, whilst the joint formation 14 constitutes the male joining member. The female joint formation 13 rigidly connects to the strip main body 11 and extends along a longitudinal edge portion of the strip 10 which is offset from the body 11 of the strip by one wall thickness thereof, and comprises an approximately mushroom-shaped socket 16 which opens to the inner surface of the strip 10.

The male joint formation 14 is carried by a movable longitudinal edge portion 15 of the strip 10 and comprises a male joining rib 17 having an enlarged head at its free end, the male joining rib 17 being engageable with a snap fit in the socket 16 of a female joint formation 13 of an adjacent winding or convolution. In accordance with the present invention, a hinge formation 18 hingedly connects strip edge portion 15 to the body 11 of the strip 10. In this embodiment, the longitudinal edge portion 15 (hereinafter "the hinged edge portion") which carries the male joining rib 17 is able to be folded back into an out-of-use position wherein it lies approximately parallel to the body 11 of the strip 10, the hinge 18 comprising a flexible web formed by a pair of closely spaced inverted U-shaped grooves or recesses 20 extending longitudinally of the strip 10 (refer FIG. 3). Alternatively, the hinge 18 may be formed by co-extruding with the strip 10 a thin section of softer plastics material which can have the same wall thickness as the strip 10, thereby avoiding any discontinuities in the inner surface of the strip 10. A resilient soft plastics material will also cause, to some degree, the flap 15 to spring-back from its folded back position.

Each of the female joint formations 13 terminates in a horizontally projecting flange or lip 21 which, as shown in FIG. 2 of the drawings, is arranged to abut against the vertical leg of a T-shaped rib 12 adjacent the hinged edge portion 15 of an adjacent winding or convolution of the strip 10. The adjacent windings of the strip 10 can then be interlocked by simply urging the male joining rib 17 carried on the hinged edge portion 15 of the strip into interlocking engagement with the socket 16 of the female joining member 13.

Figure 5:
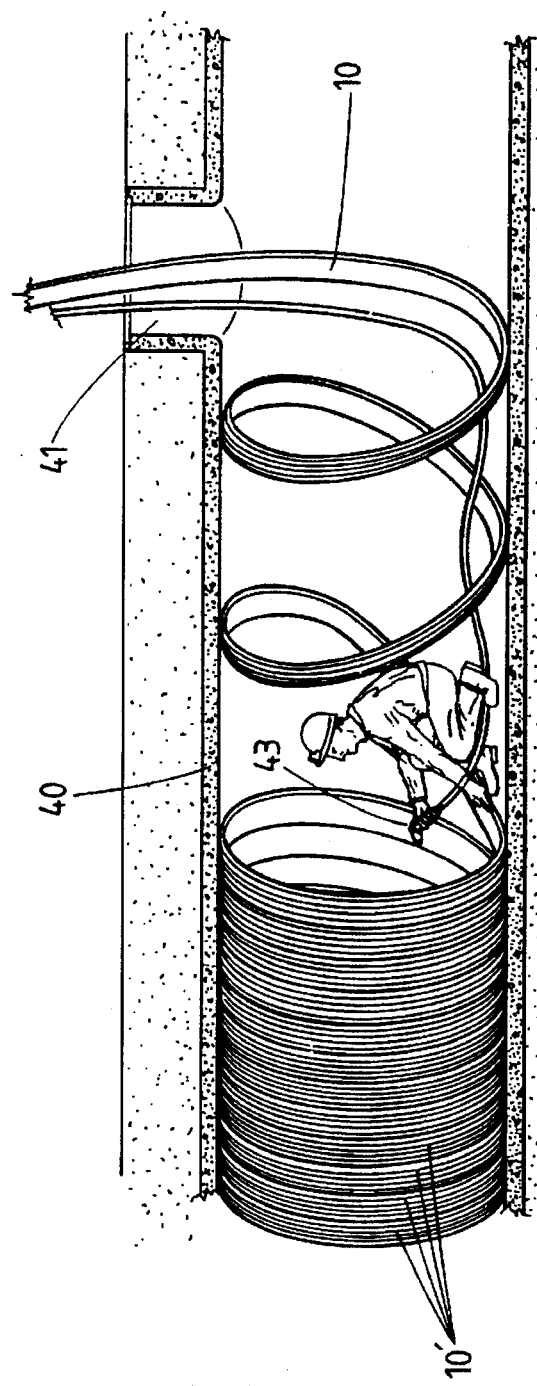
FIG. 5 is a schematic view, partly sectioned, showing how the liner strip is used to reline a damaged pipe or passageway, in accordance with the invention.

In use, when a pipe or passageway 40 is to be relined or repaired, as shown in FIG. 5 of the drawings, the plastic profiled strip 10 with the edge portion 15 in its folded back position, is manually pulled down a manhole 41 and into the man-entry pipe 40, with the windings or convolutions being roughly positioned against the inner surface of the pipe by a workman. The windings or convolutions 10' of the strip 10 are then accurately aligned in groups, successively along the length of the pipe, with each of the windings intimate with the inner surface of the pipe 40. The hinged edge portion 15 carrying the male joining rib 17 is then swung or "flipped" over so that the joining rib 17 engages into the socket of the female locking member of an adjacent winding, the male joining rib being urged into its locked position preferably with the aid of a vibrating hammer 43 or a rotating, spring-loaded arm carrying a flap engaging roller at one end thereof, the roller itself being vibrated. This process can be used to form a liner extending from manhole to manhole.

It should of course be appreciated that the profiled strip 10 may be fed into the pipe 40 with the hinged edge portion 15 approximately horizontally aligned with the main body of the strip 10, and the flap portion 15 folded back by the workman in the pipe 40 during the installation procedure, ie prior to aligning the windings of the strip 10, and thereafter swung back to its aligned position for interlocking with the female joining member 13.

As shown in FIG. 3, when the joint formations are properly interlocked, the inner surfaces of adjacent windings are flush with one another.

It should be appreciated that the liner strip 10, used to reline the pipe, can be a continuous length of plastic profiled strip 10 which the workman pulls into the interior of the pipe in a helical configuration (refer FIG. 5) or the liner strip 10 can be cut into separate workable lengths the ends of which are butt-jointed together either by an appropriate connector or by welding.

Normally a workman will locate and align a small number of windings or convolutions of the strip 10 and thereafter progressively lock the adjacent windings of the strip together by hammering the hinged male locking member into position. These steps are then repeated progressively along the length of the pipe to be relined. This procedure is clearly illustrated in FIG. 5 of the drawings.

When the liner has been formed between adjacent manholes, grout may be injected into the space between the liner strip 10 and the inner surface of the pipe 40 in accordance with well known procedure.

Referring now to FIG. 4 of the drawings, in a second embodiment of the invention, adjacent windings or convolutions of the liner strip 30 are interlocked together by means of a separate joining member 31 which itself comprises a male joining rib 32 carried on a hinged portion of the member 31 and a female joining rib 33 which has internal walls defining a socket 34 which faces in the opposite direction of the rib 32, the socket 34 being adapted to receive and interlock with a male locking rib 35 formed along a rigid longitudinal edge portion of strip 30. The female joining rib 33 of the joining member 31 is arranged to be permanently attached to the male rib 35 on the strip 30, eg by fusion or adhesion.

The male rib 32 is flexibly connected to the female joining member 33 by means of a reduced wall thickness section 36 which forms a hinge and permits portion 37 of the joining member 31 which carries the locking rib 32 to flex about an axis which extends longitudinally of the strip 30.

Preferably the separate joining member 31 is formed of a soft plastics material whilst the liner strip 30 is formed of a relatively rigid plastics material, eg high density polyethylene.

The separate joining member 31 shown in FIG. 4 permits existing plastic profiled strips to be modified so as to incorporate the features of the present invention, and thereby avoid having to produce new dies for integrally moulding the liner strip as shown in FIG. 1 of the drawings.

Referring to FIGS. 6 and 7 of the drawings, in another embodiment of the invention, the liner strip 10 has fitted thereto a stiffening or enhancer strip 45 formed of rigid plastics material, eg PVC, the strip 45 having a corrugated profile comprised of alternate outwardly directed hollow rib formations 46 and approximately U-shaped channel formations 47. Each of the rib formations 46 is configured in a manner so as to be interlockable with a respective T-shaped rib 12, with each of the channel formations 47 projecting inwardly into a respective channel formed between a pair of adjacent ribs 12, with the bottom wall of the channel formation 47 contacting the outer surface of the body 11 of the strip 10.

In this embodiment, the hollow ribs 46 are formed with reentrant portions 48 adjacent their inner upper ends, which co-operate with the free edge portions of the flanges 49 of the ribs 12 in order to lock the strips 10, 45 together. In addition, the inner marginal edge portion of the strip 45 terminates in an outwardly flared flange 50 which lockingly engages against an underside surface of flange 49, to ensure that the strips 10, 45 remain locked together.

In this embodiment, the stiffener strip 45 is press-fitted to the strip 10 adjacent the hinge formation 18, and has an outer marginal flange portion 52 abutting the outer surface of the hinged flap 14 in the region of the hinge formation 18. This serves to reinforce the strip 10 in the region of the flap 14 and as well stiffens the strip 10 to ensure that it will stay in close contiguity with the inner surface of the pipe being relined. It is desirable to employ the reinforcing strip 45 in situations where the liner strip 10 is formed of relatively soft polyethylene plastic material as opposed to using rigid PVC material.

The reinforcement of the strip 10 is advantageous in that it minimises the likelihood of the strip being overstressed during the grouting procedure and also the tendency of the male and female locking members to disengage during the grouting procedure. Any overstressing of the wound strip is likely to cause inward bulging of the wall of the liner.

When using the stiffened liner strip, it will of course be appreciated that the strip 10 along with the stiffening strip 45 fitted thereto is fed into the interior of the pipe being relined and spirally positioned against its inner cylindrical surface.

When the liner strip is used to reline square or rectangular passageways or shafts which may be horizontal or vertical, it is necessary to provide a series of transverse notches, eg cuts, in the T-shaped ribs to allow the liner strip to flex and curve neatly around the corner regions of the shaft. These cuts should be made at an angle to the longitudinal axis of the strip.

It should be appreciated that the strip of the present invention may be used to reline pipes of size insufficient to accommodate a workman. In these cases the locking engagement of the joint formations is effected by means of a rotating or vibrating plug which is caused to travel along the interior of the pipe once the windings have been machine wound into position.

In another variation to the present invention, the liner strip can be installed as a series of separate lengths each cut to a length to match exactly the inner circumference of the pipe to be relined. The lengths form a series of concentric rings (by welding abutting edges of each length of strip) and when positioned in juxtaposed relationship with the pipe, the hinged flaps are rotated so that the rings become mechanically locked together.

A brief consideration of the above described embodiments will indicate that the invention provides for a very simple and convenient means of jointing together adjacent windings or convolutions of a helically wound plastic profiled strip, which is particularly suited for installing protective liners into pipes, manholes, tanks or the like which are of man entry size. A feature of the present invention is that only one plastic liner strip is required to be fed into a pipe being relined and handled by a workman in carrying out the relining process.

I claim:

1. A method of renovating or relining an internal passageway such as a sewer pipe, manhole or tank, wherein an elongate plastic profiled strip having male and female joint formations extending along opposite longitudinal edges thereof, is first spirally wound into said passageway to form a plurality of convolutions or windings and the adjacent edges of adjacent said convolutions or windings of the strip are approximately axially aligned, whereafter the male and female joint formations are joined together to thereby lock said adjacent convolutions of said strip together, characterized in that said male joint formation comprises a hinged flap extending along one of said edges of said strip, including hinge means for allowing the flap to rotate about a hinge axis extending longitudinally of the strip between an unlocked position wherein the flap is hinged inwardly with respect to the plane of the strip and a locked position wherein the male joint formation is locked to a respective said female joint formation, said flap being provided with an outwardly projecting male locking rib on its outer surface, said strip being spirally wound into said passageway with the flap in its said inwardly hinged unlocked position and said flap thereafter being hinged or rotated to its said locked position where its said male locking rib interlocks with a female hollow locking rib extending along an adjacent edge of an adjacent convolution to thereby interlock said adjacent convolutions together.

2. The method according to claim 1 wherein said male locking rib comprises an outwardly directed approximately T-shaped locking rib, and wherein said female locking rib comprises a complementary shaped groove or recess formed adjacent to and extending along a respective said edge portion of the strip which is offset from the main body of the strip by one thickness of the strip.

3. The method according to either of claims 1 or 2 wherein said hinged flap is integrally formed with said profiled strip and joined thereto by said hinge means, wherein said hinge means further comprises a connecting web of reduced wall thickness.

4. The method according to claim 2 wherein said profiled strip has a substantially planar main body with the plurality of T-shaped rib formations which extend outwardly from the outer surface of said body.

5. The method according to claim 4 wherein said profiled strip is fed into said internal passageway and has lockingly fitted thereto a stiffening strip which interlocks with and overlies a portion of said profiled strip for stiffening said strip in the region of said hinged flap.

6. The method according to claim 5 wherein said stiffening strip terminates at its outer margin in an outwardly opening U-shaped channel formation which, when the strips are interlocked, has its bottom wall contiguous with the outer surface of the hinged flap in the region of its said hinge axis.

7. The method according to claim 5 wherein said stiffening strip comprises a plurality of alternating valleys and ridges having a depth which approximates to the depth of the rib formation on the main strip, each said ridge having an upper profile portion shaped and dimensioned so as to interlock with a respective T-shaped rib formation on the main strip.

8. The method according to claim 5 wherein said plastic profiled strip is extruded from soft polyethylene material and said stiffening strip is formed from relatively rigid PVC plastics material.

9. A plastic profiled strip for use in forming helically wound tubes or pipes, comprising a series of outwardly extending rib formations spaced apart across the width of the strip on the outer side thereof to thereby form a series of open longitudinally extending side-by-side channels, a male joint formation adjacent one longitudinal edge of said strip and extending therealong, and a female joint formation adjacent the other opposite longitudinal edge of the strip and extending therealong, the adjacent male and female joint formations of adjacent windings of the strip being adapted to interlock to thereby lock the adjacent windings of the strip together, characterized in that:

said male joint formation comprises a hinged flap, including hinge means between the flap and the body of the strip for allowing the flap to hinge about an axis which extends longitudinally of the strip, between a disengaged or unlocked position wherein it projects inwardly from the plane of the strip and a locking or engaged position wherein it interlocks with said female joint formation of an adjacent winding of the strip, and an outwardly directed approximately T-shaped locking rib on the outer surface of said flap, and said female joint formation comprises a complementary shaped socket formed in an edge portion of the strip which is offset from the main body of the strip by one thickness of the strip.

10. A plastic profiled strip according to claim 9 wherein said female joint formation terminates in a horizontally extending lip or flange which is arranged to abut the vertical wall of a respective said rib formation located adjacent said one longitudinal edge portion of an adjacent winding or convolution.

11. A plastic profiled strip according to claim 9 further comprising a separate stiffening strip which interlocks with and overlies a portion of said profiled strip for stiffening the profiled strip in the region of said one of said joint formations.

12. A plastic profiled strip according to claim 11 wherein said stiffening strip has a corrugated profile.

13. A plastic profiled strip according to claim 12 wherein said stiffening strip has a marginal portion thereof which overlies a portion of said hinged flap.

14. A plastic profiled strip according to claim 13 wherein said stiffening strip terminates at its outer margin in an outwardly opening U-shaped channel formation which, when the strips are interlocked, has its bottom wall contiguous with an outer surface portion of the hinged flap adjacent said hinge axis.

15. A plastic profiled strip according to claim 11 wherein said stiffening strip comprises a plurality of alternating valleys and ridges having a depth which approximates to the depth of the rib formations on the profiled strip, each said ridge having an upper profile portion shaped and dimensioned so as to interlock with a respective T-shaped rib formation on said profiled strip, when the stiffening strip is press-fitted thereonto.

16. A plastic profiled strip according to claim 15 wherein each of the valleys of the stiffening strip projects inwardly into a respective channel formed between a pair of adjacent rib formations, with the bottom wall of said valley contacting the outer surface of the body of said profiled strip.

17. A plastic profiled strip according to claim 11 wherein said plastic profiled strip is extruded from soft plastics material, and said stiffening strip is formed of a relative rigid plastics material.

18. A plastic profiled strip according to claim 9 wherein said hinge means further comprises a reduced wall thickness portion which connects the flap to the body of the strip.

* * * * *